Oct. 11, 1960 J. F. MACKAY ET AL 2,955,987
HYDROCARBON REACTOR VESSEL
Filed Dec. 3, 1957 3 Sheets—Sheet 1
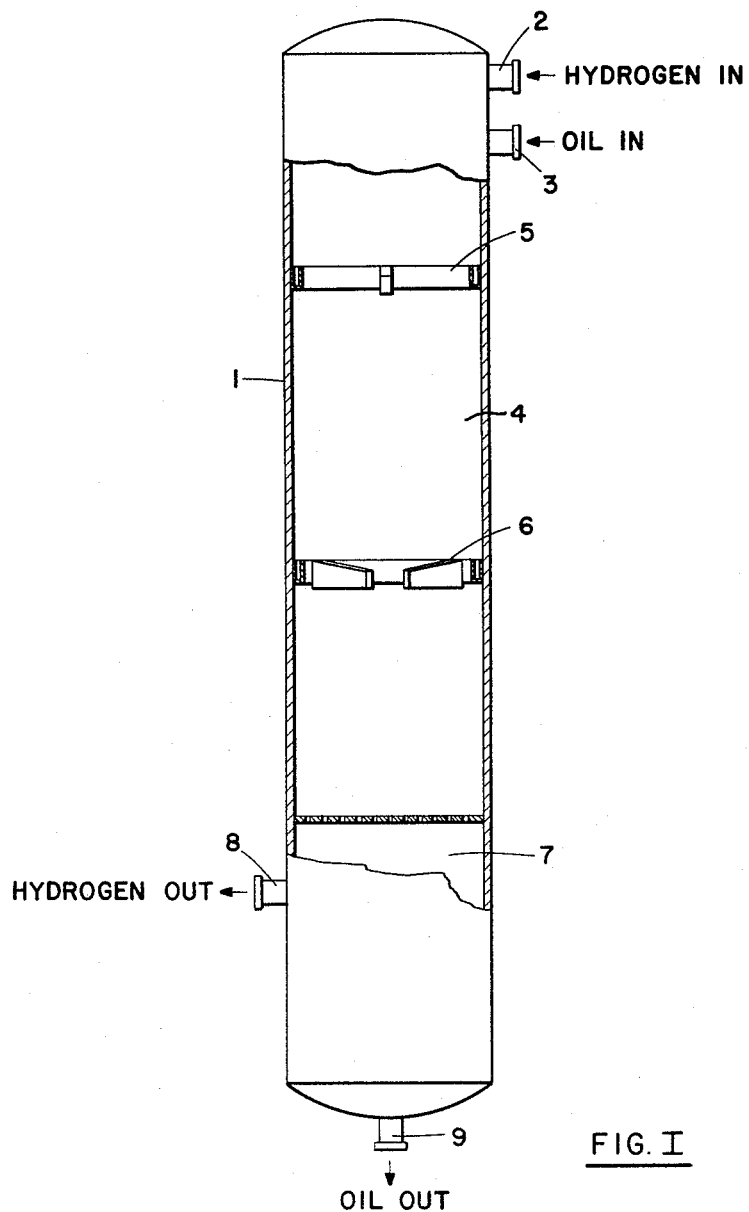
FIG. I
Jackson F. Mackay
A. George Moreton  Inventors
By H. M. Feyrer Attorney

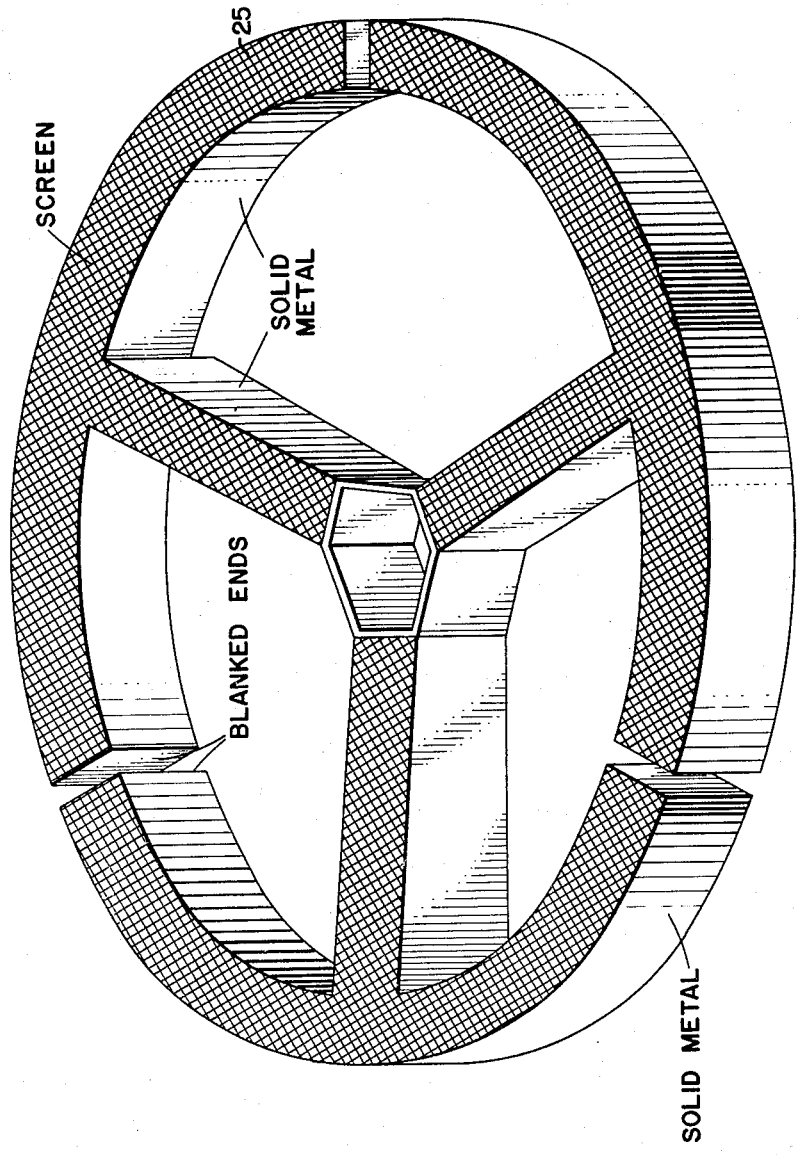

Oct. 11, 1960 — J. F. MACKAY ET AL — 2,955,987
HYDROCARBON REACTOR VESSEL
Filed Dec. 3, 1957 — 3 Sheets-Sheet 3
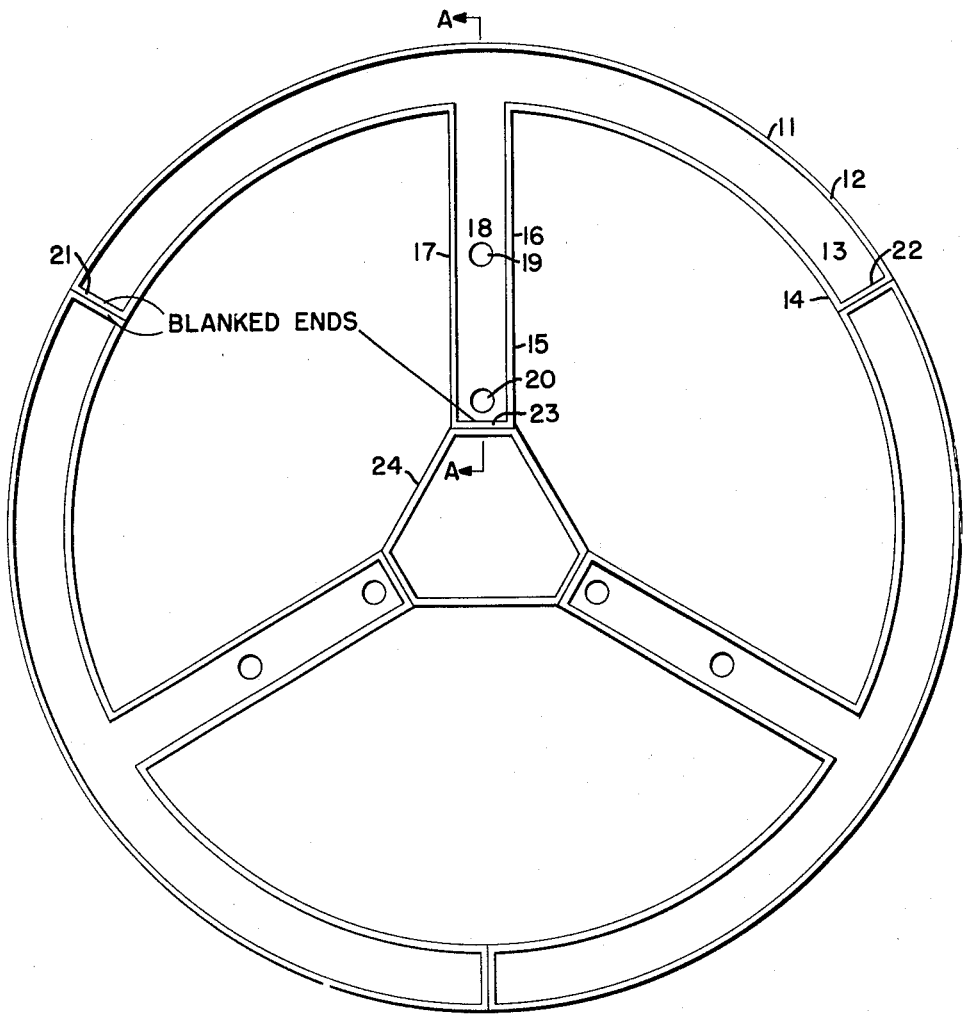
FIG. III
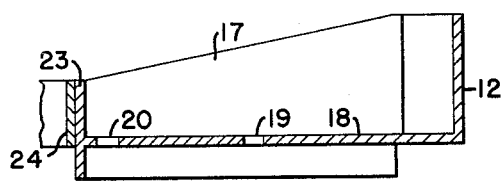
FIG. IV
Jackson F. Mackay
A. George Moreton
Inventors
By H. M. Feyrer Attorney

United States Patent Office 2,955,987
Patented Oct. 11, 1960

2,955,987

HYDROCARBON REACTOR VESSEL

Jackson F. Mackay, Sarnia, Ontario, and A. George Moreton, Willowdale, Ontario, Canada, assignors to Esso Research and Engineering Company, a corporation of Delaware Filed Dec. 3, 1957, Ser. No. 700,433

Claims priority, application Canada July 30, 1957

5 Claims. (Cl. 196—46)

This invention relates to an improved reactor vessel provided with horizontal baffle means for use in liquid phase, fixed or moving bed catalytic reactions and to an improved hydrocarbon conversion process utilizing said reactor. More particularly, this invention concerns a downflow "flooded reactor" wherein a fixed bed of catalyst is disposed in the reactor and the said catalyst is submerged in the oil undergoing treatment. A gas may, of course, also be supplied with the liquid phase oil passing through the reactor.

According to the present invention it has been found that when liquid hydrocarbon oil is introduced into the top of an unbaffled reactor containing a fixed bed of catalyst and said oil is allowed to flow freely down through the reactor there is a tendency for some of the oil to by-pass the bulk of the catalyst bed by flowing down the sides of the reactor. This, of course, gives poor contacting between the catalyst and the oil and poor conversion to desired products. In accordance with the present invention baffle means are arranged within the reactor to collect the oil from the sides of the reactor and redistribute it to the center area of the reactor through a trough arrangement. In the particular baffle shown in the accompanying drawings three separate T-shaped trough members collect the oil flowing along the wall in the arcuate top portion of the T's and transfer it toward the middle of the reactor in the stem portion of the T's from which the collected oil discharges through weep holes in the bottom of the T-shaped trough members. Obviously, a lesser or greater number of separate T-shaped elements may be used but the particular three element arrangement shown appears to maximize the advantages of well redistributing the oil over the center section of the reactor without at the same time blinding any appreciable quantity of the catalyst to the downflowing oil. Similar redistributing means can be provided at different levels within the reactor depending upon the over-all height of the reactor bed.

The present invention will be better understood by reference to the accompanying drawings of which Fig. I represents a vertical view, partly in section, of a lube oil hydrofiner reactor with the baffles installed, Fig. II represents a perspective view of a baffle arrangement in accordance with the present invention, Fig. III represents a plan view of the baffle with the screen removed, and Fig. IV represents a vertical cross section of a portion of a T-shaped trough member taken along line AA of Fig. III.

Fig. I of the drawings represents a vertical view partly in section of a lube oil hydrofiner with two baffles installed. The reactor is shown empty so that the position of the baffles may be demonstrated. Hydrogen enters the top of reactor 1 through line 2 and hydrocarbon oil enters through line 3. The combined stream goes down through catalyst bed 4. That part of the stream of oil which tends to flow down the sides of the reactor is caught by redistribution baffles 5 and 6 and is redirected into the center of the vessel. The baffles 5 and 6, as will more fully appear below, comprise three T-shaped trough members and accordingly baffle 6 is rotated 60° from the position of baffle 5 so that the stem portion of a T of baffle 6 bisects the angle between two stem portions of T's of baffle 5. This produces a good distribution of liquid from the baffles down the column. Of course, an arrangement of the stems of one baffle directly below the stems of the other baffle may also be used. The hydrofined liquid and gas pass from the catalyst bed 4 into knock-out or disengaging section 7 where hydrogen is separated from the liquid hydrocarbon oil. The hydrogen is then discharged from the vessel through line 8 and the hydrofined oil is discharged through line 9. This hydrofined oil is then, of course, passed to suitable additional processing not shown as, for example, to a stripper to remove residual $H_2S$ and if desired to fractionation.

As mentioned previously, the purpose of the present baffle is to redirect to the center of the reactor the oil that tends to flow down the sides of the reactor. Thus as can be seen in Fig. II, with the present baffle this oil is caught along the inner wall of the reactor in the arcuate top portion of the T-shaped troughs and redirected to the center of the reactor via the stem portions of the T's and is discharged through weep holes in the bottom of the said stem portions of the T-shaped trough members. Screen or punched metal plate covers at least the arcuate portion of these troughs to keep catalyst from filling and plugging the system. The stem portion of the T's can of course be covered with solid metal plate rather than screen if desired as it is of course not necessary to collect and redistribute oil from this area of the reactor. This screen is of about 10 mesh. This is small enough to keep out catalyst and large enough to permit free flow of liquid into the troughs. Of course, the larger the size of the catalyst particles the coarser the screen may be. Oil discharges from the trough members in the center region of the reactor through two or more weep holes (not shown in Fig. II) in the bottom of the stem portion of each of the T-shaped trough members. While the baffle arrangement shown in Fig. II is essentially a self-contained unit, it would also be possible to utilize the inner wall of the reactor as the outer wall of the baffle arrangement as by welding the outer edges of the screens and the bottom of the trough to the inner wall of the reactor vessel.

As shown in plan view in Fig. III the baffle assembly comprises three identical T-shaped trough members. Each of these T-shaped members consists of an arcuate top portion 11 having an outer wall 12, a bottom 13 and an inner wall 14 and a stem portion 15 extending radially toward the center of the reactor. The stem portion 15 has side walls 16 and 17 and bottom 18. Weep holes 19 and 20 are provided in the bottom 18 of the stem portion in order to discharge the oil toward the middle of the reactor. End walls 21 and 22 are provided on the arcuate top portion and an end wall member 23 is provided at the bottom of the stem portion. A frame or support member 24 is provided to which the bottoms of the stem portions are secured.

Fig. IV shows a sectional view in elevation taken along line AA of Fig. III. At the outside wall 12 of the baffle the trough is 4" deep. Hatched line 13 in the figure represents the solid metal bottom of the arcuate portion of the trough, and hatched line 18 represents the bottom of the stem portion of the trough while the line below said stem portion indicates that the solid side wall 17, of this stem portion of the trough is extended below the bottom of the trough about 1" to form a skirt. This allows free space for the oil draining from the weep holes 19 and 20 to feed down onto and through the catalyst bed and prevents plugging of the holes with catalyst since catalyst loaded from the top of the vessel will not fill the area under the skirt. It can also be seen that the stem portion of the radial trough is closed at its end 23 near the center of the reactor. Thus flow of liquid hydrocarbon oil from the stem portion of the T occurs only through the weep holes 19 and 20. Hatched line 24 represents the support member to which the bottom of the stem portion of the baffle is secured.

In a preferred embodiment, the present invention relates to the hydrofining of lube oil stocks to improve color and color stability and to effect acid number reduction etc. In many applications the finished lube stocks must meet exacting specifications that in the past have not been attainable by hydrofining alone but have required additional clay treating processing. By the present invention utilizing the present baffles it has now been found possible to meet these specifications by hydrofining alone.

Hydrofining is defined as an operation in which petroleum hydrocarbons are contacted with hydrogen in the presence of a catalyst at pressures of less than about 1600 p.s.i.g. and temperatures of less than about 800° F. in order to improve the quality or to prepare them for further processing. The reactions taking place under these conditions are desulfurization, removal of nitrogen and/or oxygen and hydrogenation of unsaturated compounds. The combined results of all these reactions and a characteristic of the hydrofining process is the net consumption of hydrogen occurring therein.

The hydrofining catalysts that can be employed include 5-15% molybdenum oxide on activated alumina, mixtures of cobalt oxide (2-6 wt. percent) and molybdenum oxide (6-15 wt. percent) on activated alumina, an equivalent amount of cobalt molybdate on activated alumina, and other sulfur resistant hydrogenation catalysts such as those of the nickel-tungsten sulfide type.

Regeneration of the fixed bed catalyst may be required periodically depending largely upon the nature of the feed stock and the severity of the treatment. This regeneration is conveniently carried out at a temperature of about 750° to 1000° F. with an oxygen containing gas. A moving bed process may also be used so that a portion of the catalyst may be continuously regenerated and the reactor kept continuously on stream.

In the hydrofining operation the oil and hydrogen are contacted with catalyst by continuous flow through a vessel packed with catalyst. The oil feed to the reactor is preheated to the required temperature by means of a furnace or similar means. Hydrogen may or may not be heated prior to feeding to the reactor depending on the quantity used. The degree of contact of oil saturated with hydrogen with the catalyst is determined by the ratio of the oil flow rate to the catalyst volume.

After the hydrofining process has been carried out the liquid is then passed to a stripper to remove residual $H_2S$. It may then be fractionated or kept intact.

The advantages of the present baffle and of the present baffled reactor will be better understood by reference to the following examples describing results obtained in the hydrofining of lube oil stocks. In these examples the level of improvement in quality attained by hydrofining lube oils is best indicated by the color of the product attained. This measure will therefore be used in the following examples.

*Example 1*

A commercial sized 2½ ft. diameter by 29 ft. depth fixed bed reactor was tested with and without four baffles of the type shown in the diagrams installed. The catalyst used was cobalt molybdate on activated alumina in the form of ⅛″ pills. The following results were obtained with a turbine oil having an SAE viscosity of 60 obtained from Leduc Western Canadian crude oil.

| Stock | Baffle | Charge, b./hr. | V./v./hr. | Temp., °F. | Press., p.s.i. | Hydrogen Consumption, s.c.f./b. | Hydrogen Feed Rate, s.c.f./b. | Color |
|---|---|---|---|---|---|---|---|---|
| Turb. 60 | No | 20 | 0.8 | 650 | 600 | <100 | 300 | 2 Robinson. |
| Turb. 60 | Yes | 23 | 0.9 | 625 | 600 | <100 | 300 | 9 Robinson. |

Prior to the baffle installation an inspection of only two Robinson color was attainable, and this could not be improved by lowering charge rate or by a second pass. The run made following the baffle installation yielded a product having an excellent Robinson color of 9 in a one pass operation. Additionally it was possible to raise the charge rate to 23 b./hr. and the space velocity to 0.9 v./v./hr. with no degradation in color.

*Example 2*

The same reactor was used baffled as in Example 1 in the hydrofining of a low cold test SAE 40 oil obtained from Tia Juana crude. The following results were obtained.

| Stock | Baffle | Charge, b./hr. | V./v./hr. | Temp., °F. | Press., p.s.i. | Hydrogen Consumption, s.c.f./b. | Hydrogen Feed Rate, s.c.f./b. | Color |
|---|---|---|---|---|---|---|---|---|
| LCT 40X | Yes | 14.8 | 0.6 | 600 | 600 | <100 | 300 | 9 R.C. |
| LCT 40X | Yes | 14.8 | 0.6 | 575 | 600 | <100 | 300 | 9 R.C. |

Difficulty was expected in running this feed stock but an excellent product was obtained at a charge rate of 15 b./hr. During the latter part of the run the temperature was reduced from 600° F. to 575° F. with no change in the color improvement obtained. Undoubtedly charge rates could have been increased but the particular run was too short to make this evaluation.

It is to be understood that this invention is not limited to the specific examples which have been offered merely as illustrations and that modifications may be made without departing from the spirit of the invention.

What is claimed is:

1. In a downflow liquid phase hydrocarbon reactor containing a fixed bed of catalyst, the improvement which consists in at least one horizontal baffle disposed in said reactor, said baffle comprising a circular trough arrangement the outside of which is flush against the side of the reactor and means for discharging collected liquid in the center area of the reactor, said means for discharging the collected liquid being troughs extending in toward the center of the reactor and having sides extended as skirts down beneath the bottoms of said troughs, said circular trough and said troughs extending in toward the center being covered with a screening means to prevent solid material from filling and thus clogging the circular trough and said troughs while at the same time allowing free flow of liquid into the circular trough and in said troughs.

2. The apparatus of claim 1 in which the troughs extending in toward the center of the reactor have a screen covering as said screening means, are closed at their ends near the center of the reactor, and have apertured bottoms in the center area of the reactor.

3. The apparatus of claim 2 in which the troughs extending in toward the center of the reactor are 3 in number.

4. In a downflow liquid phase hydrocarbon reactor containing a fixed bed of catalyst and having top inlets for both hydrogen and liquid hydrocarbon, the improvement which consists in at least one horizontal baffle disposed in said reactor, said baffle comprising a circular trough having an outer wall flush against the side of the reactor and troughs extending radially toward the center of the reactor for discharging liquid collected in said circular trough into a center area of the catalyst bed, said circular and radially extending troughs being covered with screening means to prevent solid catalytic material from entering the troughs so that the liquid flows freely in the troughs without contacting solid catalytic material therein.

5. In the apparatus defined by claim 4, said trough extending radially toward the center of the reactor having end walls and apertured bottoms for draining the liquid near the center of the reactor and being interconnected by a supporting frame member at said end walls.

References Cited in the file of this patent

UNITED STATES PATENTS

| | | |
|---|---|---|
| 2,439,348 | Simpson et al. | Apr. 6, 1948 |
| 2,639,130 | Heere | May 19, 1953 |
| 2,833,698 | Patton et al. | May 6, 1958 |